US011831850B1

(12) United States Patent
Morales

(10) Patent No.: US 11,831,850 B1
(45) Date of Patent: Nov. 28, 2023

(54) MANAGEMENT OF COLOR PRINTING RESOURCES IN A PRINTING SYSTEM

(71) Applicant: Kyocera Document Solutions Inc., Osaka (JP)

(72) Inventor: Javier A Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/939,227

(22) Filed: Sep. 7, 2022

(51) Int. Cl.
*H04N 1/60* (2006.01)
*G06K 15/02* (2006.01)

(52) U.S. Cl.
CPC ......... *H04N 1/6052* (2013.01); *G06K 15/027* (2013.01); *H04N 1/6094* (2013.01)

(58) Field of Classification Search
CPC ................. H04N 1/6052–6094; G06K 15/027
See application file for complete search history.

(56) References Cited

U.S. PATENT DOCUMENTS 8,164,788 B2 * 4/2012 Wang .................. H04N 1/4078
382/167
8,564,834 B2 * 10/2013 Lin ...................... H04N 1/6033
358/1.9

* cited by examiner

*Primary Examiner* — Barbara D Reinier
(74) *Attorney, Agent, or Firm* — MILLEN, WHITE, ZELANO & BRANIGAN, P.C.; William Nixon

(57) ABSTRACT

Relative calibration is used to generate tone reproduction curves (TRCs) at multiple printing devices. A first calibration is performed for a first paper at a first printing device to generate a first TRC. A second calibration is performed for the first paper at a second printing device to generate a second TRC. A third calibration is performed for a second paper at the first printing device to generate a third TRC. A device difference dataset is determined using the first TRC and the second TRC. A paper difference dataset is determined using the first TRC and the third TRC. The device difference dataset and the paper difference dataset are used to determine a fourth TRC for the second paper at the second printing device, thereby eliminating the need for further calibration operations.

20 Claims, 8 Drawing Sheets

US 11,831,850 B1

MANAGEMENT OF COLOR PRINTING RESOURCES IN A PRINTING SYSTEM

FIELD OF THE INVENTION

The present invention relates to a printing system and associated methods to manage color printing resources at a plurality of printing devices using relative calibration. More particularly, the present invention relates to simplifying the management of color printing resources through use of difference datasets determined using the disclosed methods.

DESCRIPTION OF THE RELATED ART

Color management is one of the more complex aspects of production printing operations. Color reproduction management is a task that print shops often find difficult. This condition is due in part to the time it takes to perform color management tasks that do not generate revenue for the print shop. Color management requires calibration and, in some cases, creation of ICC profiles. Ideally, both tasks would be done for each paper and also for each printing device. It, however, may be impractical due to the amount of time that it would take to both create and update the calibration curves and the ICC profiles. For these reasons, print shops may reduce the effort taken to manage color. These reductions may be realized by, for example, using default ICC profiles in order to focus only on calibrating printing devices. Alternatively, print shops may reduce the level of effort by using paper groups, in which one paper is calibrated and profiled per group. The calibration and profile for this paper are then used for similar papers. The color for the similar papers will not be as good as if they were calibrated and had profiles. Most print shops, however, operate in this manner given the reduction in the level of effort.

SUMMARY OF THE INVENTION

A method for managing color printing resources is disclosed. The method includes calibrating a first paper at a first printing device. The method also includes generating a first tone reproduction curve (TRC) for the first paper. The method also includes storing the first TRC. The method also includes calibrating the first paper at a second printing device. The method also includes generating a second TCR for the first paper. The method also includes storing the second TRC. The method also includes determining a device difference dataset between the first TRC and the second TRC. The method also includes calibrating a second paper at the first printing device. The method also includes generating a third TRC for the second paper. The method also includes storing the third TRC. The method also includes determining a fourth TRC for the second paper using the third TRC and the device difference dataset.

The method for managing color printing resources also includes, in a separate embodiment, calibrating a third paper at the first printing device. The method also includes generating a fifth TRC for the third paper. The method also includes determining a sixth TRC for the third paper using the fifth TRC and the device difference dataset.

A method for managing color printing resources is disclosed. The method includes calibrating a first paper at a first printing device. The method also includes generating a first tone reproduction curve (TRC) for the first paper. The method also includes storing the first TRC. The method also includes calibrating a second paper at the first printing device. The method also includes generating a second TRC for the second paper. The method also includes storing the second TRC. The method also includes determining a paper difference dataset between the first TRC and the second TRC. The method also includes calibrating the first paper at a second printing device. The method also includes generating a third TRC for the first paper. The method also includes storing the third TRC. The method also includes determining a fourth TRC for the second paper using the third TRC and the paper difference dataset.

The method for managing color printing resources also includes, in a separate embodiment, calibrating a third paper at the first printing device. The method also includes generating a fifth TRC for the third paper. The method also includes storing the fifth TRC. The method also includes determining a sixth TRC for the third paper using the fifth TRC and the paper difference dataset.

A printing system having color printing resources is disclosed. The printing system includes at least one processor and at least one memory. The at least one memory includes instructions that, when executed on the at least one processor, configures the printing system to calibrate a first paper at a first printing device. The printing system also is configured to generate a first tone reproduction curve (TRC) for the first paper. The printing system also is configured to store the first TRC. The printing system also is configured to calibrate the first paper at a second printing device. The printing system also is configured to generate a second TRC for the first paper. The printing system also is configured to store the second TRC. The printing system also is configured to determine a device difference dataset between the first TRC and the second TRC. The printing system also is configured to calibrate a second paper at the first printing device. The printing system also is configured to generate a third TRC for the second paper. The printing system also is configured to store the third TRC. The printing system also is configured to determine a fourth TRC for the second paper using the third TRC and the device difference dataset.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
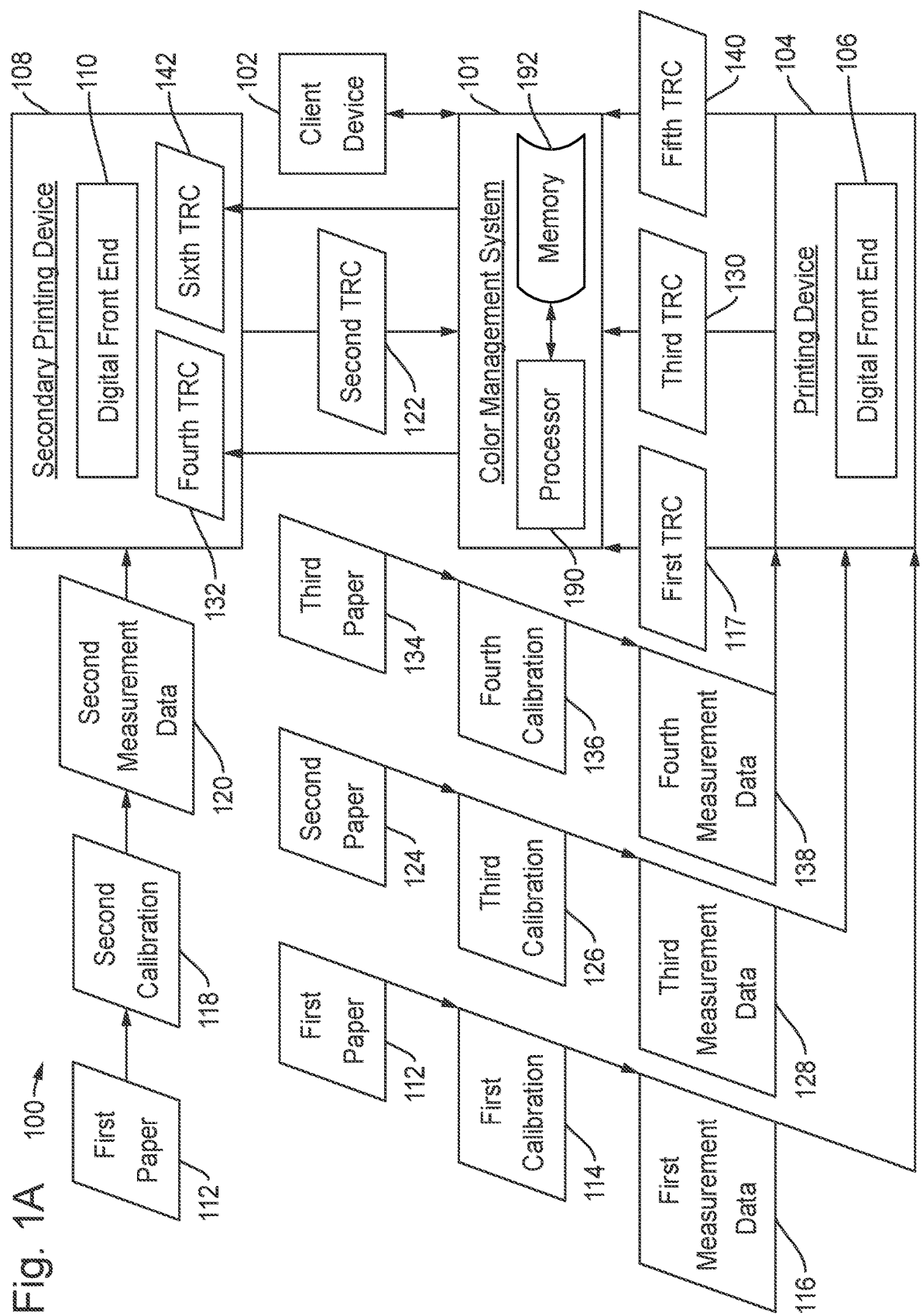
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a mechanism to reduce the total number of calibrations that a print shop must create in order to calibrate different paper or papers on multiple printing devices. For example, an operator would calibrate paper A on a first printing device per normal calibration. The operator would then calibrate paper A on a second printing device per normal calibration. These calibrations may be done as separate calibrations. They, however, would ideally be done as a match calibration in which the second printing device is calibrated to match the output from the first printing device.

In addition to creating a tone reproduction curve (TRC) for the second printing device, as is typical, the disclosed embodiments also would store information about how the calibration curve for the specific paper in the second printing device differs from the calibration curve on the first printing device. This feature may be accomplished by storing calibration curves for the first printing device and the second printing device in the second printing device. The printing system then could use these two curves to calculate the difference in the calibration curves between the first printing device and the second printing device. Alternatively, this feature may be accomplished by storing a calibration curve that represents the difference between the first printing device and the second printing device in the second printing device. This information also may be stored in a color management server that is accessible by the first printing device and the second printing device.

The operator may calibrate paper B on the first printing device per normal calibration. The disclosed embodiments may calculate the difference in the calibration curve between paper B and paper A on the first printing device. The disclosed embodiments would send the information about the difference in the paper A and the paper B calibration curves to the second printing device. Alternatively, the printing system may send the paper B calibration curve to the second printing device. Once the printing system has information about how the paper B calibration curve differs from the paper A calibration curve, the printing system may use this information to create a relative calibration for paper B on the second printing device.

For example, using a single data point, a value for 50% gray on the first printing device requires the raster image processor (RIP) to send for 65% gray when using paper A. A value for 50% gray on the second printing device requires the RIP to send data for 62% gray when using paper A. The 3% difference in 50% gray represents a 4.6% reduction for 50% gray between the first printing device and the second printing device. A value of 50% gray on the first printing device requires the RIP to send data for 63% gray when using paper B. The 2% difference in 50% gray represents a 3.1% reduction for 50% gray between papers A and B. Given the above example, the disclosed embodiments may determine that reproducing 50% gray in the second printing device using paper B would require the RIP to send data for 61% gray.

The printing system may perform a calculation similar as disclosed above for all data points in the TRCs, which may be 255 data points for each of the four (4) colors used for printing operations. The disclosed embodiments may generate a calibration curve for the second printing device while requiring that the operator only print and measure the first paper. The printing system may use other processes to calculate the difference between printing devices and papers. The calculations would most likely be done using density values and not percentages in the calibration curves.

The disclosed embodiments would represent a significant reduction in the number of color management operations that an operator would need to perform. Using another example, a print shop has three printing devices and need calibration curves for 10 papers to be used on the three printing devices. Using conventional processes, the operator would have to perform 30 different calibrations, one for each paper in each printing device. The disclosed embodiments would allow the operator to perform 12 different calibrations instead. Using this example, the operator would perform 10 calibrations for the source printing device, or one for each paper. The operator would perform 1 calibration for the other printing devices on any of the papers. The other 9 calibrations for the rest of the printing devices would be relative calibrations that are created using the difference information disclosed herein. The disclosed embodiments significantly reduce the amount of work and tasks that a print shop does in order to ensure accurate color management for the printing device fleet.

FIG. 1A depicts a printing system 100 for printing documents using printing device 104 and secondary printing device 108 according to the disclosed embodiments. Printing system 100 may be located in a print shop or other environment suitable for production printing operations. Printing system 100 includes one or more printing devices that receive print jobs from one or more client devices 102, which may communicate with color management system 101.

The printing system may use a color management system 101 to manage color printing resources within system 100. In some embodiments, color management system 101 is a server within system 100. Color management system 101 may include a processor 190 that is coupled to a memory 192. Memory 192 may include instructions that configures processor 190 to have color management system 101 perform the functions disclosed below.

Color printing resources also may be generated and managed at the printing devices. For example, printing device 104 include digital front end (DFE) 106, also known as a controller, and secondary printing device 108 include DFE, 110. A preferred configuration of a DFE according to the disclosed embodiments may be found in FIG. 1B. DFEs 106 and 110 may send and receive color management resources from color management system 101.

According to the disclosed embodiments, the operator within system 100 calibrates first paper 112 on printing device 104, per normal calibration. Thus, first calibration 114 is performed on first paper 112. First calibration 114 generates first measurement data 116, as measured using first paper 112. DFE 106 of printing device 104 generates first tone reproduction curve (TRC) 117 as a result of first measurement data 116. First TRC 117 may be provided to color management system 101. First measurement data 116 also may be provided to color management system 101.

The operator then may calibrate first paper 112 on secondary printing device 108, per normal calibration. Second calibration 118 generates second measurement data 120. Second measurement data 120 is used to generate second TRC 122. Second TRC 122, and possibly second measurement data 120, may be provided to color management system 101. As disclosed here, first calibration 114 and second calibration 118 of first paper 112 are done separately. In some embodiments, first calibration 114 and second calibration 118 may be done as a match calibration in which secondary printing device 108 is calibrated to match the output from printing device 104.

Match calibration is similar to recalibration operations at a single printing device but is performed between two or more printing devices as opposed to recalibration that is done with the same printing device at two points in time. Printing device 104 includes first TRC 117 that is associated with first measurement data 116. Secondary printing device 110 may include second TRC 122 that also may be associated with first measurement data 116. Thus, first measurement data 116 ties the TRCs between the printing devices with each other.

During the match calibration operations, printing device 104 includes first TRC 117. Secondary printing device 108 performs a calibration operation to determine whether its response is the same as printing device 104. Printing device 108 may use first measurement data 116 that results in second TRC 122. In other words, the calibration operation at secondary printing device 108 may be treated as a recalibration operation for printing device 104. Match calibration pass/fail status is determined for the comparison between first TRC 117 and second TRC 122. The TRCs may be different but preferably they should match densities that are output at the printing devices using first measurement data 116.

In addition to creating second TRC 122 for secondary printing device 108, the disclosed embodiments may store information about how the calibration curve for second TRC 122 corresponding to first paper 112 differs from the calibration curve for first TRC 117 corresponding to first paper 112. This process is disclosed in greater detail below. This feature may be accomplished by storing first TRC 117 and second TRC 122 in DFE 110 at secondary printing device 108. When the difference between the calibration curves of the TRCs is needed, secondary printing device 108 may perform operations to determine the difference.

Alternatively, this feature may be accomplished by storing a device difference dataset, or a calibration curve, that represents the differences between first TRC 117 and second TRC 122 in DFE 110 of secondary printing device 108. This process also is disclosed in greater detail below. In some embodiments, first TRC 117 and second TRC 112 also are stored at color management system 101. Color management system 101 may perform the operations to determine the differences between the calibration curve of first TRC 117 and the calibration curve of second TRC 122. This device difference dataset may be stored at color management system 101.

The operator calibrates second paper 124 on printing device 104, per normal calibration. Third calibration 126 may be performed using second paper 124 to generate third measurement data 128. DFE 106 of printing device 104 uses third measurement data 128 to create third TRC 130, which corresponds to second paper 124. The disclosed embodiments, however, do not need to perform calibration operations for second paper 124 at secondary printing device 108.

The disclosed embodiments calculate the difference in the calibration curve of first TRC 117 corresponding to first paper 112 and the calibration curve of third TRC 130 corresponding to second paper 124. Third TRC 130 also may be stored, along with third measurement data 128, at color management system 101. DFE 106, or color management system 101, may determine a paper difference dataset based on first TRC 117 and third TRC 130. The paper difference dataset may be disclosed in greater detail below. It also may a calibration curve of the differences between the calibration curve of first TRC 117 and the calibration curve of third TRC 130. The paper difference dataset may be stored at DFE 106, or, preferably, at color management system 101. The paper difference dataset may be provided to secondary printing device 108 when loading second paper 124 thereon.

Secondary printing device 108 generates fourth TRC 132 corresponding to second paper 124 without performing calibration operations. Instead, secondary printing device 108 uses the device difference dataset determined from first TRC 117 and second TRC 122 and the paper difference dataset determined from first TRC 117 and third TRC 130 to create a relative calibration for second paper 124 on secondary printing device 108. This process is disclosed in greater detail below. It should be noted that the differences between TRCs are used to generate additional TRCs based on this relative calibration.

Additional papers may use the process of relative calibration to be used at secondary printing device 108 without the need for calibration operations. For example, third paper 134 may be loaded onto printing device 104. Fourth calibration 136 is performed to generate fourth measurement data 138 related to third paper 134. DFE 106 generates fifth TRC 140 based on fourth measurement data 138. Fifth TRC 140, along with fourth measurement data 138, may be stored on color management system 101.

The disclosed embodiments determine a paper difference dataset by finding the differences between the calibration curve for first TRC 117 and the calibration curve for fifth TRC 140. The paper difference dataset for first paper 112 and third paper 134 is provided, preferably from color management system 101, to secondary printing device 108 so that it can generate sixth TRC 142 corresponding to third paper 134 using relative calibration. No calibration operations are performed at secondary printing device 108 for third paper 134. In some embodiments, color management system 101 generates sixth TRC 142 using relative calibration and provides sixth TRC 142 to secondary printing device 108.

Figure 1B:
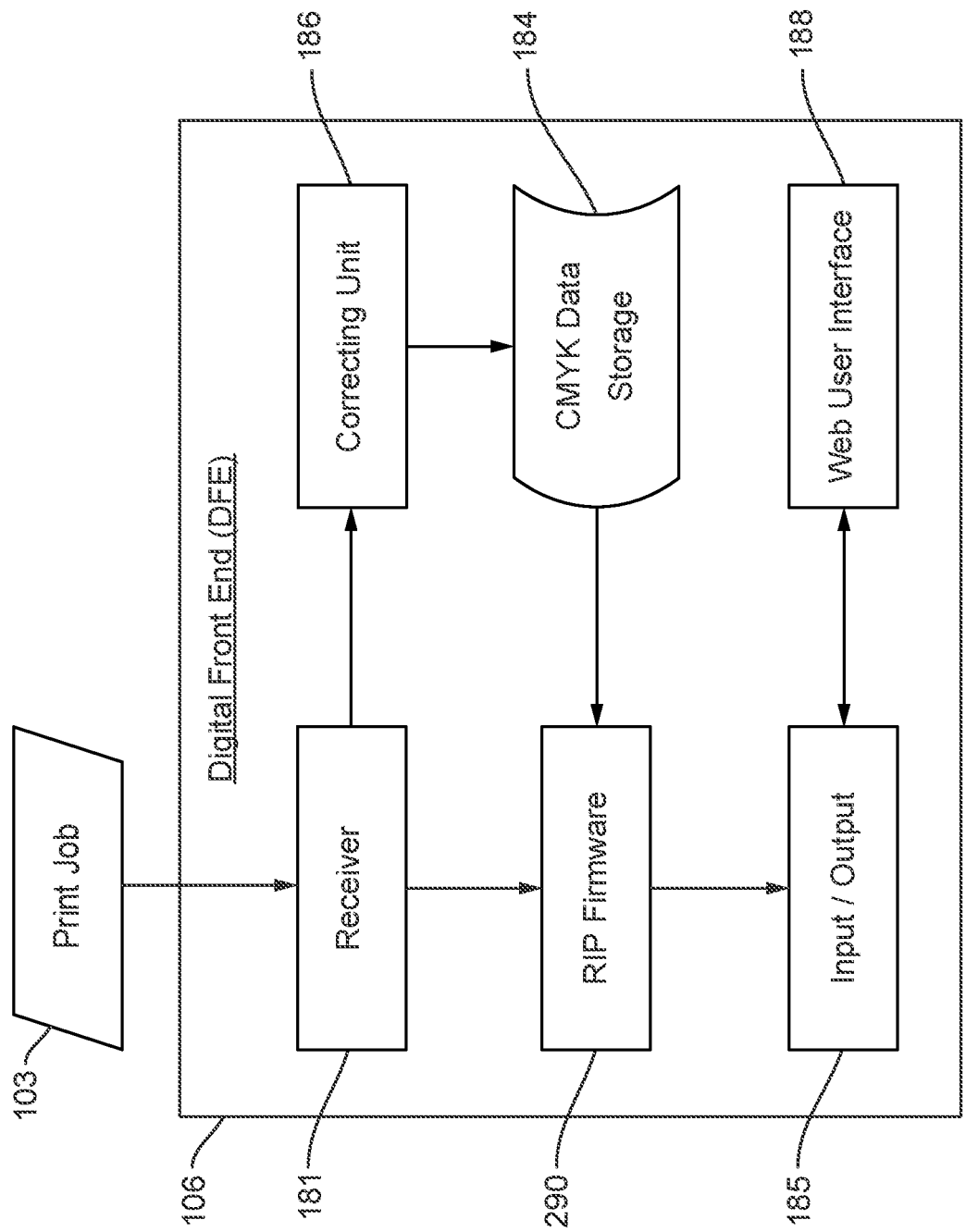
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2. Additional components within DFE 106 may be implemented, including those disclosed in FIG. 1A.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or color management system 101, if it is located at a separate device, using, for example, input/output connector 185. Web user interface 188, or web application, allows a user of the DFEs of other printing devices to interact with content or software running on DFE 106.

Figure 2:
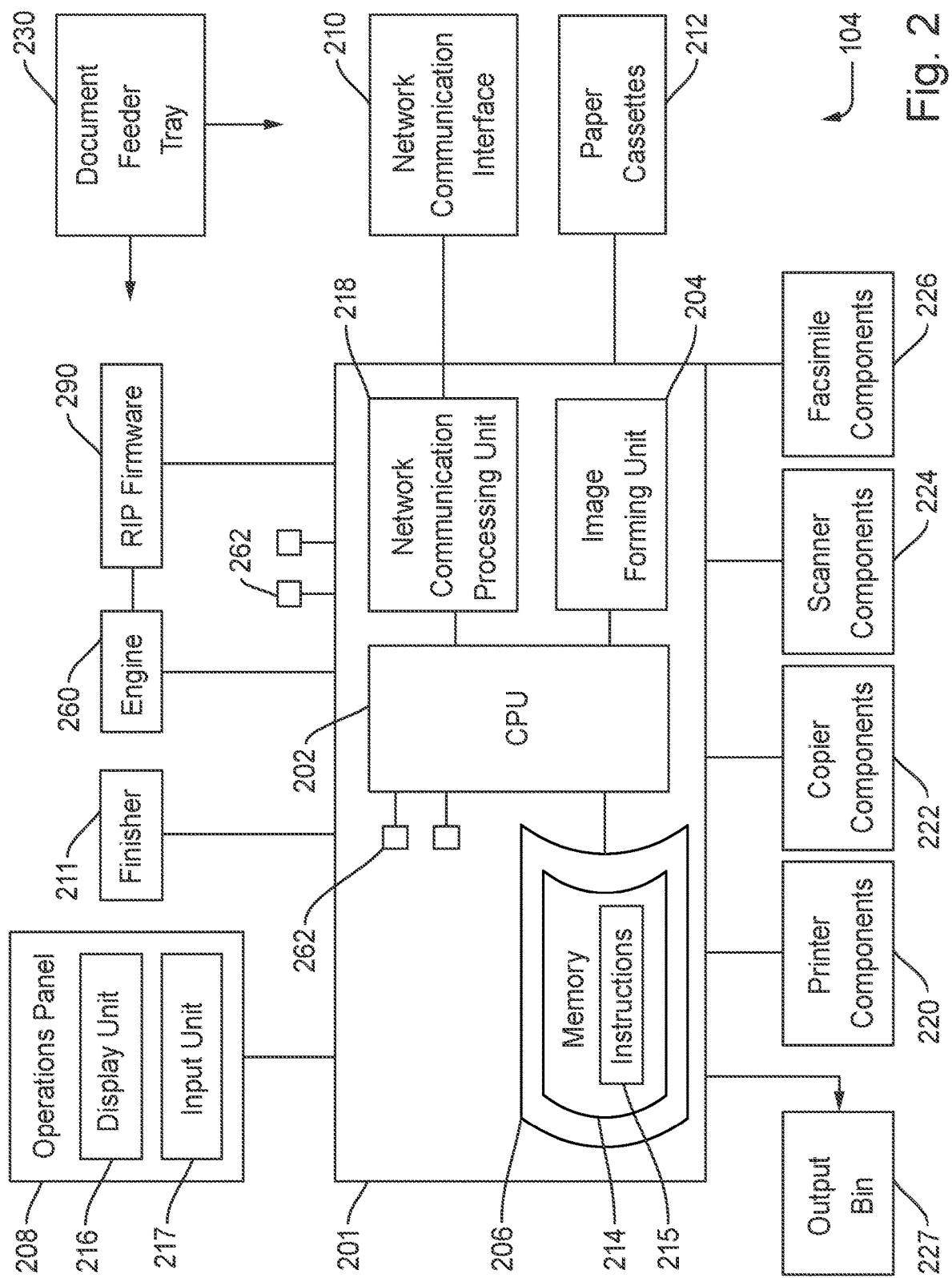
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from color management system 101, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from color management system 101, if applicable. Color management system 101 may send calibration and paper catalog information to printing device 104 for display. For example, the operator at printing device 104 may send calibration 110 to printing device 104. Printing device 104 displays paper type 112 and any other information.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management system 101 as well as other printing devices within system 100.

Figure 3:
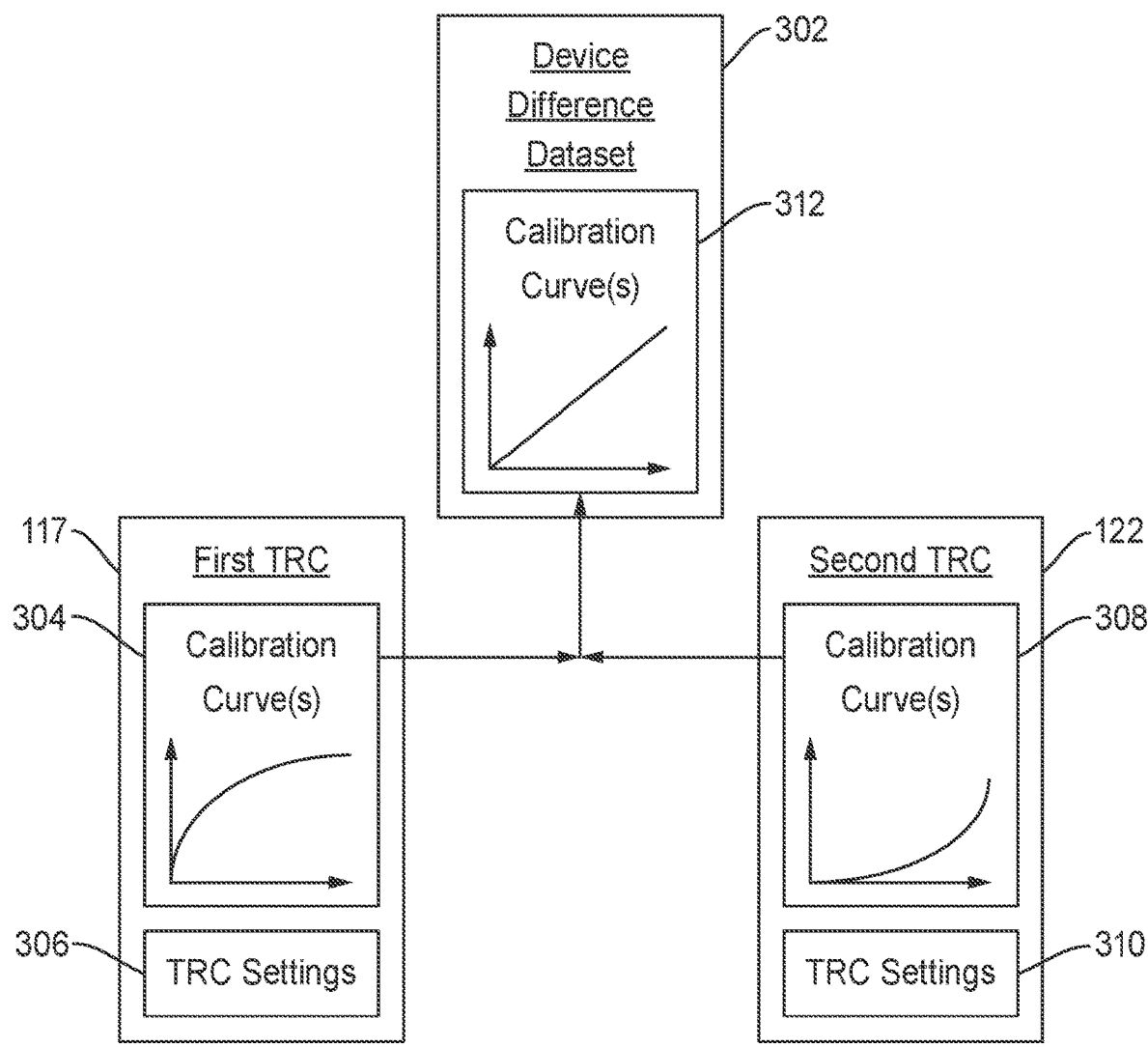
FIG. 3 illustrates a block diagram of a first TRC and a second TRC being used to generate a device difference dataset according to the disclosed embodiments.

FIG. 3 depicts a block diagram of first TRC 117 and second TRC 122 being used to generate a device difference dataset 302 according to the disclosed embodiments. Device difference datasets may be generated for two TRCs created at different printing devices for the same paper. The operations disclosed below to generate device difference dataset 302 may be performed within DFE 110 of secondary printing device. They also may be performed by color management system 101. As disclosed above, first TRC 117 may be created at DFE 106 using first measurement data 116 corresponding to first paper 112 being used at printing device 104. Second TRC 122 may be created at DFE 110 using second measurement data 120 corresponding to first paper 112 being used at secondary printing device 108.

First TRC 117 includes one or more calibration curves 304. For example, there may be a calibration curve for each color used in color printing operations at printing device 104. If the colors are cyan, magenta, yellow and black (CMYK), then first TRC 117 may include four calibration curves. First TRC 117 also includes TRC settings 306, such as end point targets, gray scale replacement, ink limits, and the like. When color printing using first paper 112, DFE 106 may adjust the density of the output of the colors based on their respective calibration curves and TRC settings 306.

Second TRC 122 includes one or more calibration curves 308. Second TRC 122 is used by DFE 110 of secondary printing device 108 for color printing operations using first paper 112. As disclosed above, second TRC 122 may be generated using second measurement data 120 obtained by second calibration 118 for first paper 112. Alternatively, second TRC 122 may be generated using match calibration operations with printing device 104. Second TRC 122 also includes TRC settings 310. TRC settings 310 may differ from TRC settings 306 for first TRC 117.

The disclosed embodiments may compare one or more calibration curves 304 of first TRC 117 with one or more calibration curves 308 of second TRC 122. The disclosed embodiments determine the difference between the curves to generate corresponding one or more difference calibration curves 312. The differences may be included in device difference dataset 302. The disclosed embodiments may perform a calculation for all data points in first TRC 117 and second TRC 122. For example, there may be 255 data points for each of the four colors used for printing. The differences between these data points in calibration curve(s) 304 and calibration curve(s) 308 are used to created difference calibration curve(s) 312 for device difference dataset 302.

Device difference dataset 302 may represent the adjustments that should be made if first paper 112 is printed on secondary printing device 108 using color printing operations as compared to color printing operations at printing device 104. Device difference dataset 302 may be stored on color management system 101 or at DFE 110 of secondary printing device 108.

Figure 4:
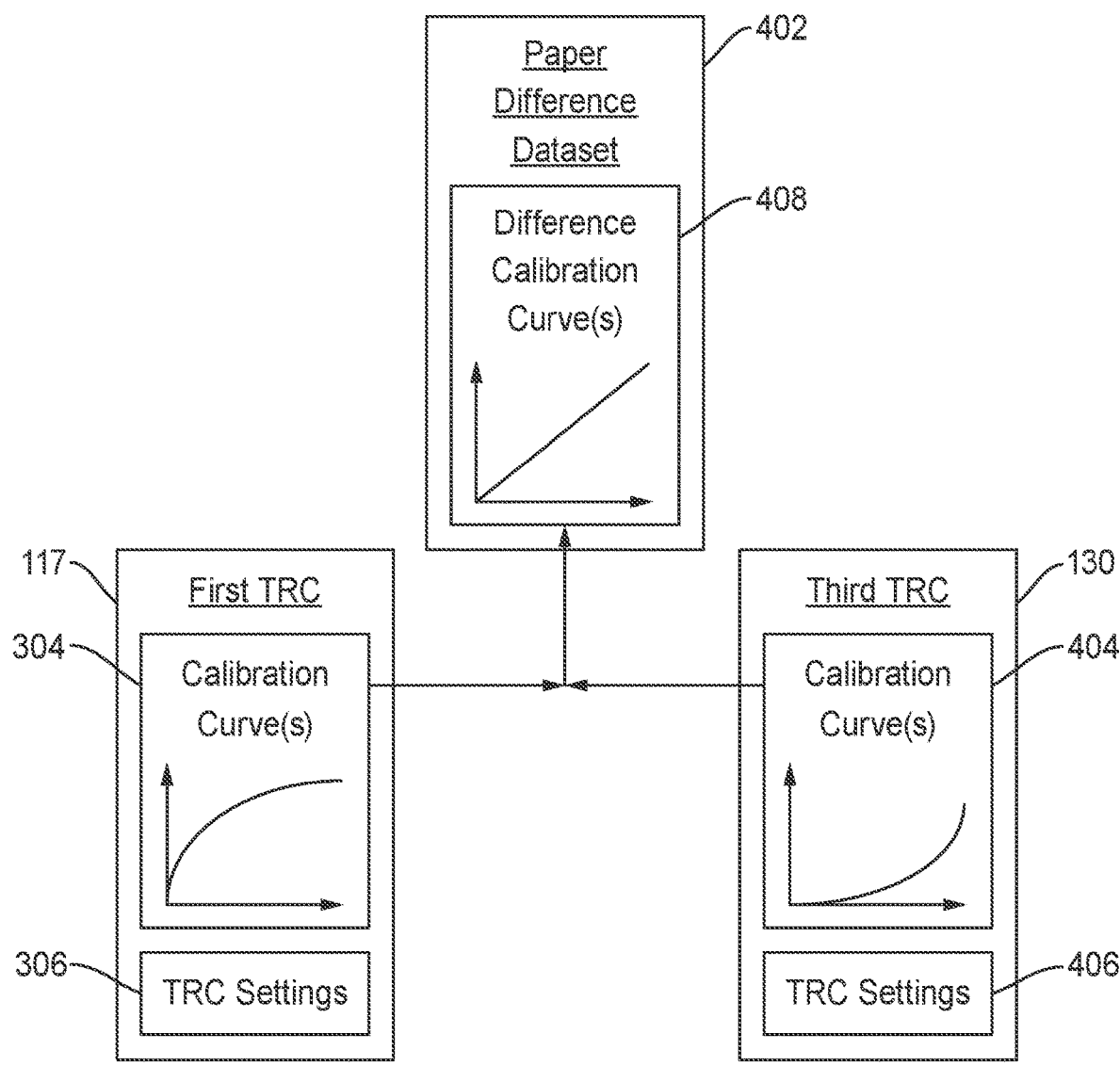
FIG. 4 illustrates a block diagram of a first TRC and a third TRC being used to generate a paper difference dataset according to the disclosed embodiments.

FIG. 4 depicts a block diagram of first TRC 117 and third TRC 130 being used to generate a paper difference dataset 402 according to the disclosed embodiments. First TRC 117 is disclosed above. Third TRC 130 is generated for second paper 124 at printing device 104. Third calibration 126 is performed to generate third measurement data 128, which is then used to create third TRC 130. Third TRC 130 includes one or more calibration curve(s) 404 to be used in color printing operations for second paper 124 at printing device 104.

The disclosed embodiments calculate paper difference dataset 402 using the differences between one or more calibration curves 304 of first TRC 117 and one or more calibration curves 404 of third TRC 130. The same operations used to generate device difference dataset 302 may be used here. One or more difference calibration curves 408 are created for paper difference dataset 402. The disclosed embodiments may perform a calculation for all data points in first TRC 117 and third TRC 130. For example, there may be 255 data points for each of the four colors used for printing. The differences between these data points in calibration curve(s) 304 and calibration curve(s) 404 are used to created difference calibration curve(s) 408 for device difference dataset 402.

Paper difference dataset 402 may represent the adjustments that should be made if second paper 124 is printed on printing device 104 using color printing operations as compared to color printing operations for first paper 112 at printing device 104. Paper difference dataset 402 may be stored on color management system 101, DFE 106 of printing device 104, or at DFE 110 of secondary printing device 108.

Figure 5:
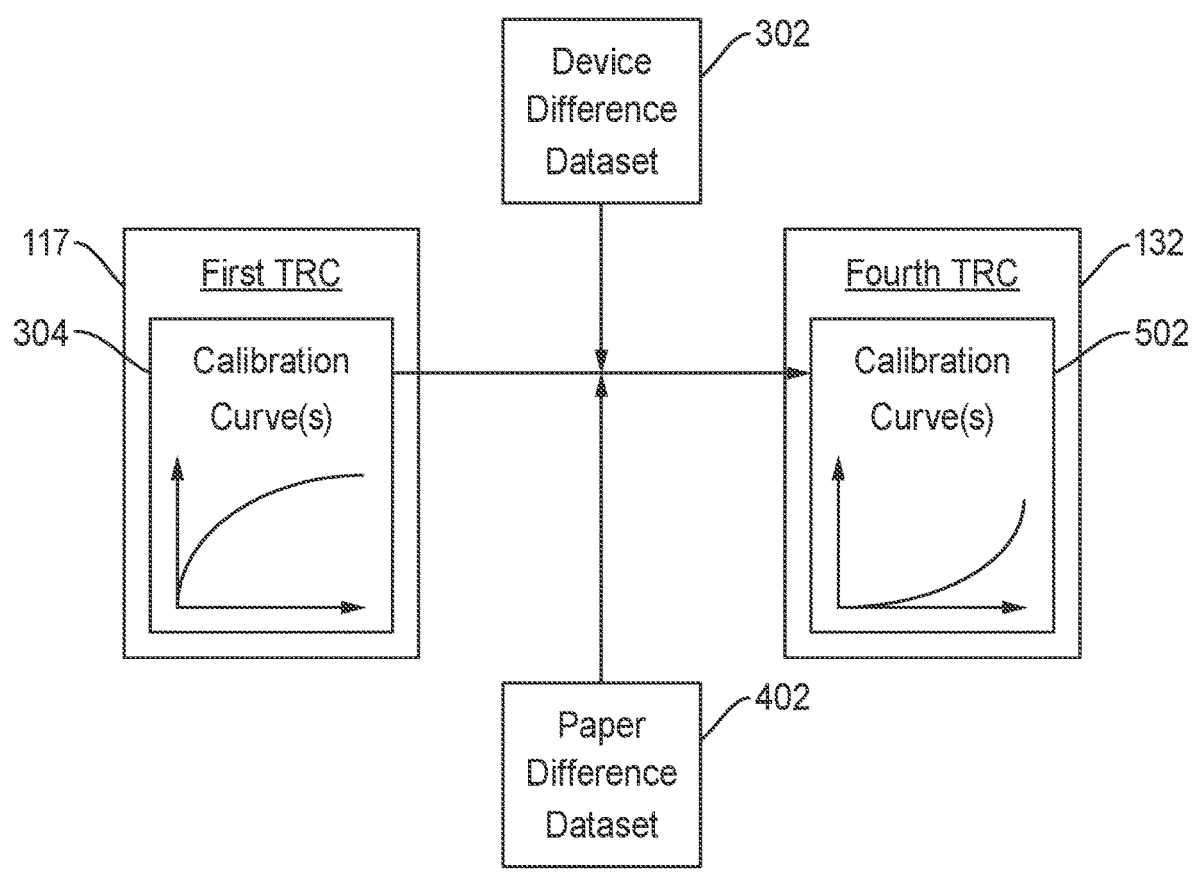
FIG. 5 illustrates a block diagram of using the device difference dataset and the paper difference dataset to generate a fourth TRC for a second paper to be used in color printing operations at the secondary printing device according to the disclosed embodiments.

FIG. 5 depicts a block diagram of using device difference dataset 302 and paper difference dataset 402 to generate fourth TRC 132 for second paper 124 to be used in color printing operations at secondary printing device 108 according to the disclosed embodiments. FIG. 5 shows how a relative calibration may be performed to generate fourth TRC 132 without the need for additional calibrations. The relative calibration may be performed at color management system 101 or DFE 110 of secondary printing device 108.

The disclosed embodiments take the information about how calibration curve 404 of third TRC 130 corresponding to second paper 124 differs from calibration curve 304 of first TRC 117 corresponding to first paper 112 and use it to create the relative calibration for second paper 124 on secondary printing device 108. The relative calibration may occur for the data points within the calibration curves between the different TRCs.

Using first TRC 117, which preferably should be stored at printing device 104, color management system 101, and secondary printing device 108, the difference calibration curves 312 for device difference dataset 302 and the difference calibration curves 408 for paper difference dataset 402 are additionally used in conjunction to adjust the values for the densities used to provide the desired color when creating fourth TRC 132. The specified color density values in the TRCs are adjusted according to the difference between printing devices and then according to the differences between the papers.

For example, for 50% gray density on printing device 104, first TRC 117 requires the RIP in DFE 106 to send data for 65% gray when using first paper 112. For 50% gray density on secondary printing device 108, second TRC 122 requires the RIP in DFE 110 to send data for 62% gray when using first paper 112. Thus, device difference dataset 302 indicates that there is a 3% difference for 50% gray for using first paper 112 between printing device 104 and secondary printing device 108. This 3% difference may represent a 4.6% reduction for 50% gray between printing device 104 and secondary printing device 108.

As fourth TRC 132 corresponds to second paper 124, the difference between first paper 112 and second paper 124 also should be taken into account. Thus, using the example above, for 50% gray density on printing device 104, first TRC 117 requires the RIP in DFE 106 to send data for 65% gray when using first paper 124. For 50% gray density on printing device 104, third TRC 130 requires the RIP in DFE 106 to send data for 63% gray when using second paper 124. Thus, paper difference dataset 402 indicates that there is a 2% difference for 50% on printing device 104 between using first paper 112 and second paper 124. This 2% difference may represent a 3.1% reduction for 50% gray between first paper 112 and second paper 124.

Given the values provided by device difference dataset 302 and paper difference dataset 402, the disclosed embodiments may determine that reproducing 50% gray density in secondary printing device 108 when using second paper 124 would require the RIP of DFE 110 to send data for 60% gray. Fourth TRC 132 will note this in its own calibration curves 502. As noted above, the disclosed embodiments may perform a calculation similar to the above example for all data points in the TRCs, which may be 255 data points for each of the four colors. Calibration curves 502 may be built using the data from first TRC 117, device difference dataset 302, and paper difference dataset 402 without the need for additional calibration operations. Only first paper 112 needs to be calibrated at secondary printing device 108.

It should be noted that this is an example and that the disclosed embodiments may use other methods to calculate the differences between printing devices and papers. The calculations may preferably be done using density values and not percentages in the calibration curves.

For third paper 134, the same process may be repeated in that a paper difference dataset 402 is created between first TRC 117 and fifth TRC 140. Secondary printing device 108 may determine sixth TRC 142 using third paper 134 by relative calibration using device difference dataset 302 for the differences between printing device 104 and secondary printing device 108 and paper difference dataset 402 for the differences between first paper 112 and third paper 134.

If there is a third printing device, then a TRC for first paper 112 would be generated at the third printing device. For printing second paper 124 at third printing device, the disclosed embodiments would determine a device difference dataset based on the differences of the TRCs for first paper 112 at printing device 104 and the third printing device. Thus, the TRC for second paper 124 would be determined using device difference dataset 302 for differences between printing device 104 and the third printing device and using paper difference dataset 402 for differences between first paper 112 and second paper 124 when printed at printing device 104.

Figure 6:
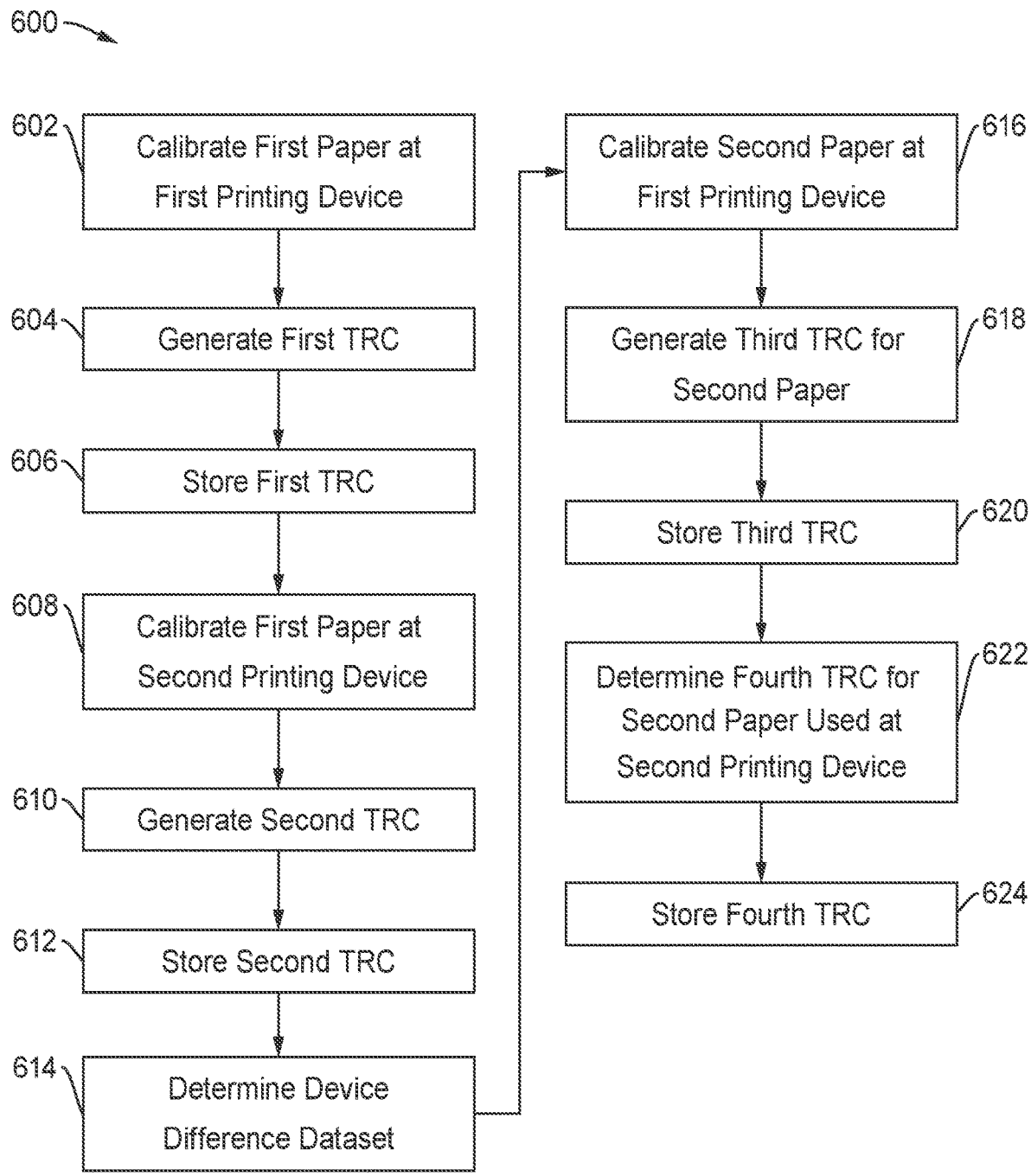
FIG. 6 illustrates a flowchart for managing color printing resources using relative calibration between two printing devices according to the disclosed embodiments.

FIG. 6 depicts a flowchart 600 for managing color printing resources using relative calibration between two printing devices according to the disclosed embodiments. Flowchart 600 may refer to FIGS. 1A-5 for illustrative purposes. Flowchart 600, however, is not limited to the embodiments disclosed by FIGS. 1A-5.

Step 602 executes by calibrating first paper 112 at a first printing device, or printing device 104. The operator may perform first calibration 114 to generate first measurement data 116 for first paper 112 at printing device 104. Step 604 executes by generating first TRC 117 for first paper 112 using DFE 106 of printing device 104. First TRC 117 may be provided to color management system 101. Step 606 executes by storing first TRC 117 at DFE 106. First TRC 117 also may be stored at color management system 101.

Step 608 executes by calibrating first paper 112 at a second printing device, or secondary printing device 108. The operator may perform second calibration 118 to generate second measurement data 120 for first paper 112 at secondary printing device 108.

Alternatively, the disclosed embodiments may perform a match calibration operation. Step 610 executes by generating second TRC 122 for first paper 112 using DFE 110 of secondary printing device 108. Second TRC 122 also may generated using the match calibration operation. Step 612 executes by storing second TRC 122 at DFE 110 of secondary printing device 108. Second TRC 122 also may be provided and stored at color management system 101. DFE 110 also may receive and store first TRC 117.

Step 614 executes by determining device difference dataset 302 based on the differences between first TRC 117 and second TRC 122. Generation of device difference dataset 302 is disclosed above. Step 616 executes by calibrating second paper 124 at the first printing device, or printing device 104. The operator may perform third calibration 126 to generate third measurement data 128 for second paper 124 at printing device 104.

Step 618 executes by generating third TRC 130 for second paper 124 using DFE 106 of printing device 104. Step 620 executes by storing third TRC 130 at DFE 106 of printing device 104. Third TRC 130 also may be provided to and stored at color management system 101.

Step 622 executes by determining fourth TRC 132 for second paper 124 to be used at the second printing device, or secondary printing device 108 according to a relative calibration operation using third TRC 130 and device difference dataset 302. In other words, third TRC 130 may be used in conjunction with first TRC 117 to provide the differences between first paper 112 and second paper 124, which are adjusted according to device difference dataset 302. As disclosed above, device difference dataset 302 may be used in relative calibration operations by adjusting data from first TRC 117 in accordance with difference data in device difference dataset 302. Step 624 executes by storing fourth TRC 132 at the second printing device, or at DFE 110 of secondary printing device 108. Fourth TRC 132 also may be provided and stored at color management system 101.

It should be noted that the relative calibration operations may be performed at color management system 101 as well as secondary printing device 108. Color management system 101 may store the applicable TRCs as well as device difference dataset 302.

Figure 7:
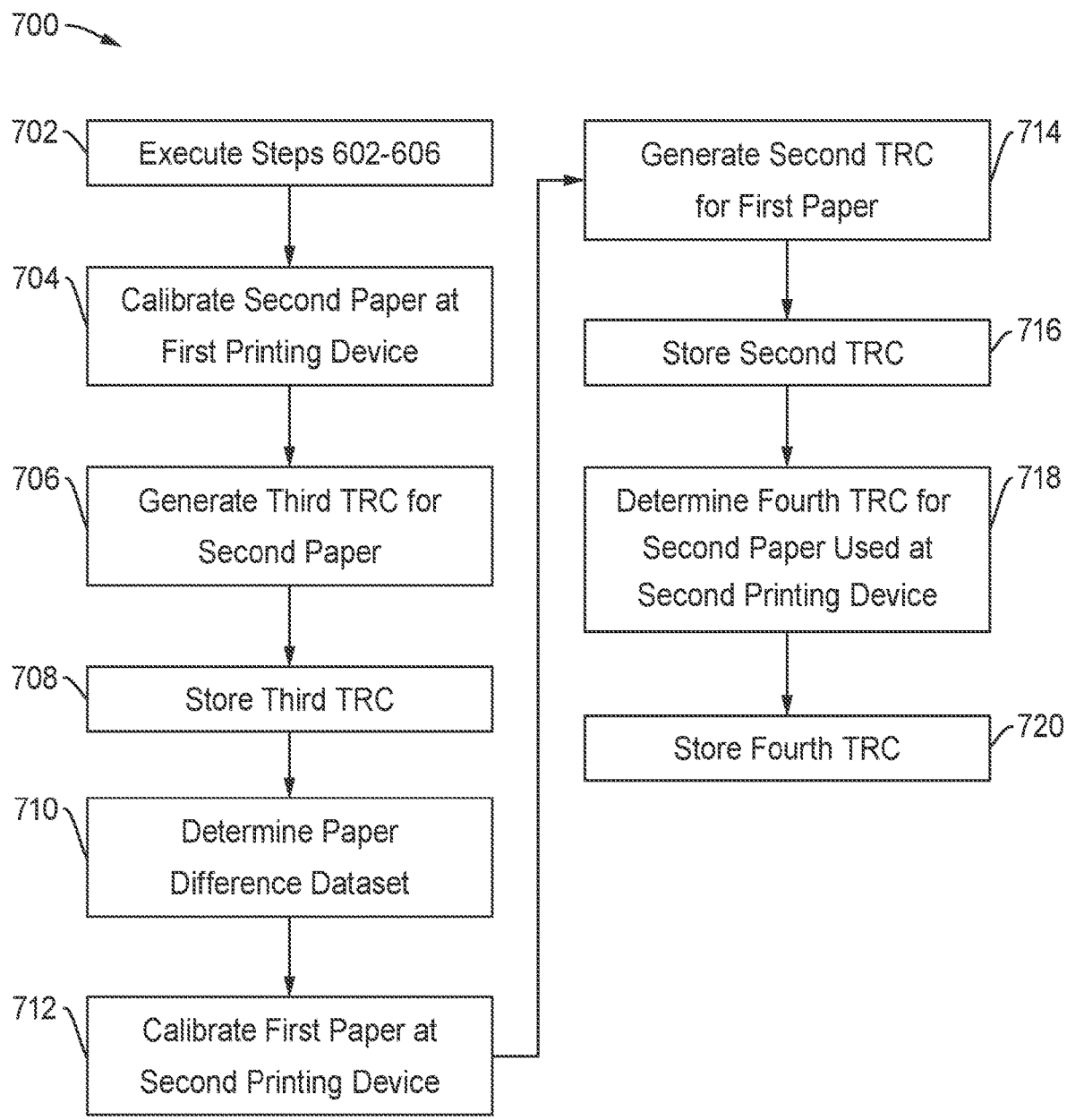
FIG. 7 illustrates a flowchart for managing color printing resources using relative calibration between different papers according to the disclosed embodiments.

FIG. 7 depicts a flowchart 700 for managing color printing resources using relative calibration between different papers according to the disclosed embodiments. Flowchart 700 may refer to FIGS. 1B-6 for illustrative purposes. Flowchart 700, however, is not limited to the embodiments disclosed in FIGS. 1B-6.

Step 702 executes by executing steps 602, 604, and 606 of flowchart 600 to generating and store first TRC 117. Step 704 executes by calibrating second paper 124 at the first printing device, or printing device 104. The operator may perform third calibration 126 to generate third measurement data 128 for second paper 124 at printing device 104. Step 706 executes by generating third TRC 130 for second paper 124 using DFE 106 of printing device 104. Step 708 executes by storing third TRC 130 at DFE 106 of printing device 104. Third TRC 130 also may be provided and stored at color management system 101.

Step 710 executes by determining paper difference dataset 402 based on differences between first TRC 117 and third TRC 130. Generation of paper difference dataset 402 is disclosed above. Step 712 executes by calibrating first paper 112 at a second printing device, or secondary printing device 108. The operator may perform second calibration 118 to generate second measurement data 120 for first paper 112 at secondary printing device 108. Alternatively, the disclosed embodiments may perform a match calibration operation. Step 714 executes by generating second TRC 122 for first paper 112 using DFE 110 of secondary printing device 108. Second TRC 122 also may be generated using the match calibration operation. Step 716 executes by storing second TRC 122 at DFE 110. Second TRC 122 also may be provided and stored at color management system 101.

Step 718 executes by determining fourth TRC 132 for second paper 124 to be used at the second printing device, or secondary printing device 108, according to a relative calibration operation using second TRC 122 and paper difference dataset 402. In other words, second TRC 122 may be used in conjunction with first TRC 117 to provide the differences between printing device 104 and secondary printing device 108, which are adjusted according to paper difference dataset 402. As disclosed above, paper difference dataset 402 may be used in relative calibration operations by adjusting data from first TRC 117 in accordance with difference data in paper difference dataset 402. Step 720 executes by storing fourth TRC 132 at DFE 110 of secondary printing device 108. Fourth TRC 132 also may be provided and stored at color management system 101.

It should be noted that the relative calibration operations may be performed at color management system 101 as well as secondary printing device 108. Color management system 101 may store the applicable TRCs as well as paper difference dataset 402.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color printing resources, the method comprising:
    calibrating a first paper at a first printing device;
    generating a first tone reproduction curve (TRC) related to a first color for the first paper;
    storing the first TRC;
    calibrating the first paper at a second printing device;
    generating a second TRC related to the first color for the first paper;
    storing the second TRC;
    determining a device difference dataset between the first TRC and the second TRC;
    calibrating a second paper at the first printing device;
    generating a third TRC for the second paper related to a second color;
    storing the third TRC;
    performing a relative calibration for the second paper at the second printing device by determining a fourth TRC for the second paper using the third TRC and the device difference dataset, wherein the fourth TRC is related to the second color; and
    printing the second paper at the second printing device using the fourth TRC to produce the second color.

2. The method of claim 1, wherein the device difference dataset includes differences between data points on a calibration curve in the first TRC and data points on a calibration curve in the second TRC.

3. The method of claim 1, further comprising storing the first TRC at the second printing device; and
    determining the device difference dataset at the second printing device using the stored first TRC and the stored second TRC.

4. The method of claim 1, further comprising storing the device difference dataset at the second printing device.

5. The method of claim 1, further comprising determining a paper difference dataset between the first TRC and the third TRC.

6. The method of claim 5, further comprising sending the paper difference dataset to the second printing device.

7. The method of claim 6, wherein determining the fourth TRC includes determining the fourth TRC using the paper difference dataset and the third TRC.

8. The method of claim 1, further comprising calibrating a third paper at the first printing device;
    generating a fifth TRC for the third paper;
    storing the fifth TRC; and
    determining a sixth TRC for the third paper using the fifth TRC and the device difference dataset.

9. A method for managing color printing resources, the method comprising:
    calibrating a first paper at a first printing device;
    generating a first tone reproduction curve (TRC) related to a first color for the first paper;
    storing the first TRC;
    calibrating a second paper at the first printing device;
    generating a second TRC related to the first color for the second paper;
    storing the second TRC;
    determining a paper difference dataset between the first TRC and the second TRC;
    calibrating the first paper at a second printing device;
    generating a third TRC related to a second color for the first paper;
    storing the third TRC;
    performing a relative calibration for the second paper at the second printing device by determining a fourth TRC for the second paper using the third TRC and the paper difference dataset, wherein the fourth TRC is related to the second color; and
    printing the second paper at the second printing device using the fourth TRC to produce the second color.

10. The method of claim 9, wherein the paper difference dataset includes differences between data points on a calibration curve in the first TRC and data points on a calibration curve in the second TRC.

11. The method of claim 9, further comprising storing the paper difference dataset at the first printing device or the second printing device.

12. The method of claim 9, further comprising determining a device difference dataset between the first TRC and the third TRC.

13. The method of claim 12, further comprising sending the device difference dataset to the first printing device.

14. The method of claim 12, wherein determining the fourth TRC includes determining the fourth TRC using the device difference dataset and the third TRC.

15. The method of claim 9, further comprising calibrating a third paper at the first printing device;
    generating a fifth TRC for the third paper;
    storing the fifth TRC; and
    determining a sixth TRC for the third paper using the fifth TRC and the paper difference dataset.

16. A printing system having color printing resources, the printing system including at least one processor, and at least one memory, wherein the at least one memory includes instructions that, when executed on the at least one processor, configures the printing system to calibrate a first paper at a first printing device;
    generate a first tone reproduction curve (TRC) related to a first color for the first paper;
    store the first TRC;
    calibrate the first paper at a second printing device;
    generate a second TRC related to the first color for the first paper;
    store the second TRC;
    determine a device difference dataset between the first TRC and the second TRC;
    calibrate a second paper at the first printing device;
    generate a third TRC related to a second color for the second paper;
    store the third TRC;
    perform a relative calibration for the second paper at the second printing device by determining a fourth TRC for the second paper using the third TRC and the device difference dataset; and
    print the second paper at the second printing device using the fourth TRC to produce the second color.

17. The printing system of claim 16, further comprising a color management server to store the device difference dataset.

18. The printing system of claim 16, wherein the at least one processor is further configured to determine a paper difference dataset between the first TRC and the third TRC.

19. The printing system of claim 18, wherein the at least one processor is further configured to send the paper difference dataset to the second printing device.

20. The printing system of claim 19, wherein the at least one processor is further configured to determine the fourth TRC using the paper difference dataset and the third TRC.

\* \* \* \* \*